(12) United States Patent
Chen et al.

(10) Patent No.: US 10,345,898 B2
(45) Date of Patent: Jul. 9, 2019

(54) CONTEXT SELECTION BASED ON USER EYE FOCUS

(71) Applicant: INTERNATIONAL BUSINESS MACHINES CORPORATION, Armonk, NY (US)

(72) Inventors: Jim C. Chen, Rochester, MN (US); Rafal P. Konik, Oronoco, MN (US); Ryan L. Rossiter, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 15/272,587

(22) Filed: Sep. 22, 2016

(65) Prior Publication Data

US 2018/0081432 A1    Mar. 22, 2018

(51) Int. Cl.
| | |
|---|---|
| *G06F 3/01* | (2006.01) |
| *G06K 9/00* | (2006.01) |
| *G06T 3/40* | (2006.01) |
| *G06F 3/0481* | (2013.01) |
| *G06F 16/9535* | (2019.01) |

(52) U.S. Cl.
CPC .............. *G06F 3/013* (2013.01); *G06F 3/0481* (2013.01); *G06F 16/9535* (2019.01); *G06K 9/00315* (2013.01); *G06K 9/00335* (2013.01); *G06T 3/40* (2013.01); *G06F 2203/04806* (2013.01)

(58) Field of Classification Search
CPC ....... G06F 3/013; G06F 2203/011; G06T 3/40
See application file for complete search history.

(56) References Cited

U.S. PATENT DOCUMENTS

| 5,731,805 A | 3/1998 | Tognazzini et al. |
| 8,185,845 B2 | 5/2012 | Bjorklund et al. |
| 2003/0225591 A1* | 12/2003 | Clay .................... G06Q 10/067 705/1.1 |

(Continued)

OTHER PUBLICATIONS

Mell et al., "The NIST Definition of Cloud Computing," National Institute of Standards and Technology, Sep. 2011, p. 1-3, Special Publication 800-145.

(Continued)

*Primary Examiner* — Jeffery A Brier
(74) *Attorney, Agent, or Firm* — Robert C. Bunker (57) ABSTRACT

Embodiments of the present invention disclose a method, computer system, and a computer program product for automatically presenting enhanced content on a mobile device based on user focus. The present invention may include presenting content on a screen. The present invention may include determining that a user is focused on a specific screen region of the presented content. The present invention may include generating a zoomed view of the presented content based on the specific screen region the user is focused on. The present invention may include presenting the zoomed view on the screen. The present invention may include determining that the user reacted positively to the zoomed view. The present invention may include, in response to determining that the user reacted positively, determining enhanced content based on zoomed content displayed in the zoomed view. The present invention may include presenting the enhanced content on the screen.

20 Claims, 6 Drawing Sheets

(56) References Cited

U.S. PATENT DOCUMENTS

| | | | |
|---|---|---|---|
| 2005/0047629 A1* | 3/2005 | Farrell | G06F 3/013 |
| | | | 382/117 |
| 2011/0029918 A1* | 2/2011 | Yoo | G06F 3/013 |
| | | | 715/800 |
| 2011/0063301 A1* | 3/2011 | Setlur | G06T 17/05 |
| | | | 345/441 |
| 2011/0175932 A1 | 7/2011 | Yu et al. | |
| 2011/0316884 A1* | 12/2011 | Giambalvo | G06F 17/30058 |
| | | | 345/660 |
| 2012/0105486 A1* | 5/2012 | Lankford | G06F 3/013 |
| | | | 345/661 |
| 2012/0197857 A1* | 8/2012 | Huang | G06F 3/0488 |
| | | | 707/706 |
| 2013/0006957 A1* | 1/2013 | Huang | G06F 3/017 |
| | | | 707/706 |
| 2014/0195918 A1 | 7/2014 | Friedlander | |
| 2014/0268054 A1* | 9/2014 | Olsson | G06K 9/00604 |
| | | | 351/209 |
| 2014/0361987 A1* | 12/2014 | Bickerstaff | G06F 3/013 |
| | | | 345/156 |
| 2015/0215245 A1* | 7/2015 | Carlson | G06F 3/04883 |
| | | | 715/752 |
| 2015/0268719 A1* | 9/2015 | Li | G06F 3/013 |
| | | | 345/156 |
| 2016/0116980 A1* | 4/2016 | George-Svahn | G06F 3/013 |
| | | | 345/168 |
| 2016/0349970 A1* | 12/2016 | Everitt | G06F 17/212 |

OTHER PUBLICATIONS

Tobii, "About Tobii," Tobii Group, p. 1-4, http://www.tobii.com/group/about/, Accessed on Sep. 7, 2016.

* cited by examiner

CONTEXT SELECTION BASED ON USER EYE FOCUS

BACKGROUND

The present invention relates generally to the field of computing, and more particularly to user interfaces.

To make devices mobile, screens on mobile devices are designed to be small and may not be able to display as much content as larger screens. Thus, some web sites and applications for mobile devices have less content to present a simplified version suited for smaller screens.

SUMMARY

Embodiments of the present invention disclose a method, computer system, and a computer program product for automatically presenting enhanced content on a mobile device based on user focus. The present invention may include presenting content on a screen. The present invention may also include determining that a user is focused on a specific screen region of the presented content. The present invention may then include generating a zoomed view of the presented content based on the specific screen region the user is focused on. The present invention may further include presenting the zoomed view on the screen. The present invention may also include determining that the user reacted positively to the zoomed view. The present invention may then include, in response to determining that the user reacted positively to the zoomed view, determining enhanced content based on zoomed content displayed in the zoomed view. The present invention may further include presenting the enhanced content on the screen.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for automatically presenting enhanced content based on user eye focus. As such, the present embodiment has the capacity to improve the technical field of user interfaces by tracking the eyes of a user to locate content displayed on a mobile device screen that interests the user and retrieve and display enhanced content or rich content based on the identified content of interest. More specifically, a focal point on the mobile device screen is identified and the region at the point the user is focused on is progressively zoomed in. Continued user focus results in retrieving additional content related to the content of interest that the user is focusing on and displaying that additional content on the mobile device screen.

As described previously, to make devices mobile, screens on mobile devices are designed to be small and may not be able to display or present as much content as larger screens. Thus, some web sites and applications for mobile devices have less content to present a simplified version suited for smaller screens. For example, small device screens are used in mobile phones and smaller screens are used in wearable devices, such as smartwatches. Content displayed on these smaller screens may be simplified to prevent overcrowding the screen and to limit data plan usage. Often, the simplified content may not provide enough information that the user is looking for, or by providing additional information the user's experience may be enhanced. In some instances, the user may not be able to interact with the screen or the user may have difficulty interacting with the screen due to the small screen size.

Therefore, it may be advantageous to, among other things, provide a way to transition from a simplified content display to an enhanced content display based on detecting the user's interest from tracking the eyes of the user.

According to at least one embodiment, the mobile device of the user detects that the user is focused on something displayed on the mobile device screen. According to at least one other embodiment, detecting that the user is squinting at the screen may be used as a trigger to start the process. The system then identifies the potential visual focus region on the screen. If the user, for example, continues to check to the same webpage and focuses on the same area of that webpage, the system may increase a confidence factor that the region is something that the user is interest in.

User eye focus may be verified by gradually zooming in to the focus region on the display. If the system detects that the user reacts negatively, such as looking away from the screen or region, the screen may be reset to the original state of the screen before any zooming occurred. However, if the user's eyes are still focused on the original focus region, then the system may know that the system is likely focused on the correct area that interests the user. The system may then repeat the process to progressively zoom in further. Throughout this process, the system may build a focus threshold.

As the focus is being confirmed, tags and other cues from the focus area may be used to derive the context of the focus area. Using known methods, the tags and other cues may be identified and retrieved for a particular displayed region on the device screen. For example, the system may determine the user focus area is labelled "Sports—Score." Then the system may determine that the format is a box score, and thereafter the system may determine that the sport is baseball. Furthermore, the system may determine that the participants are team X and team Y. The system may then scan the area for any predefined Uniform Resource Locator (URL) links. If the system locates a URL that takes the user to a page that may be focused on the content in the region of interest, then the device may save that URL as the target for a context switch.

Additionally, if no URL is found, the system may generate one based on the tags collected while establishing the content of interest. The current webpage's domain may be searched for a webpage containing related content. If the system has not found a suitable webpage within the domain, then the system may look outside that domain and generate a link to enhanced content. For example, if the user is currently gazing at a news website's baseball box scores, the system may search the news website's domain first. If no suitable sites are found, then a website for the appropriate baseball organization may be analyzed.

Once a focus threshold has been reached, a context switch may occur. Reaching the focus threshold may operate similar to the user clicking or tapping on the screen, only the user's eyes and facial reactions are used instead of a mouse click or finger tap. If the system detects that the user reacted negatively to the context switch, the display may be reverted back to the initial normal view state. Additionally, the system may also be event triggered. If a significant event occurs, such as a change in a score of a baseball game, and the system determines that the user's focus changed in reaction to the event, then the system may begin to determine the content of interest again based on the user's reaction.

Figure 1:
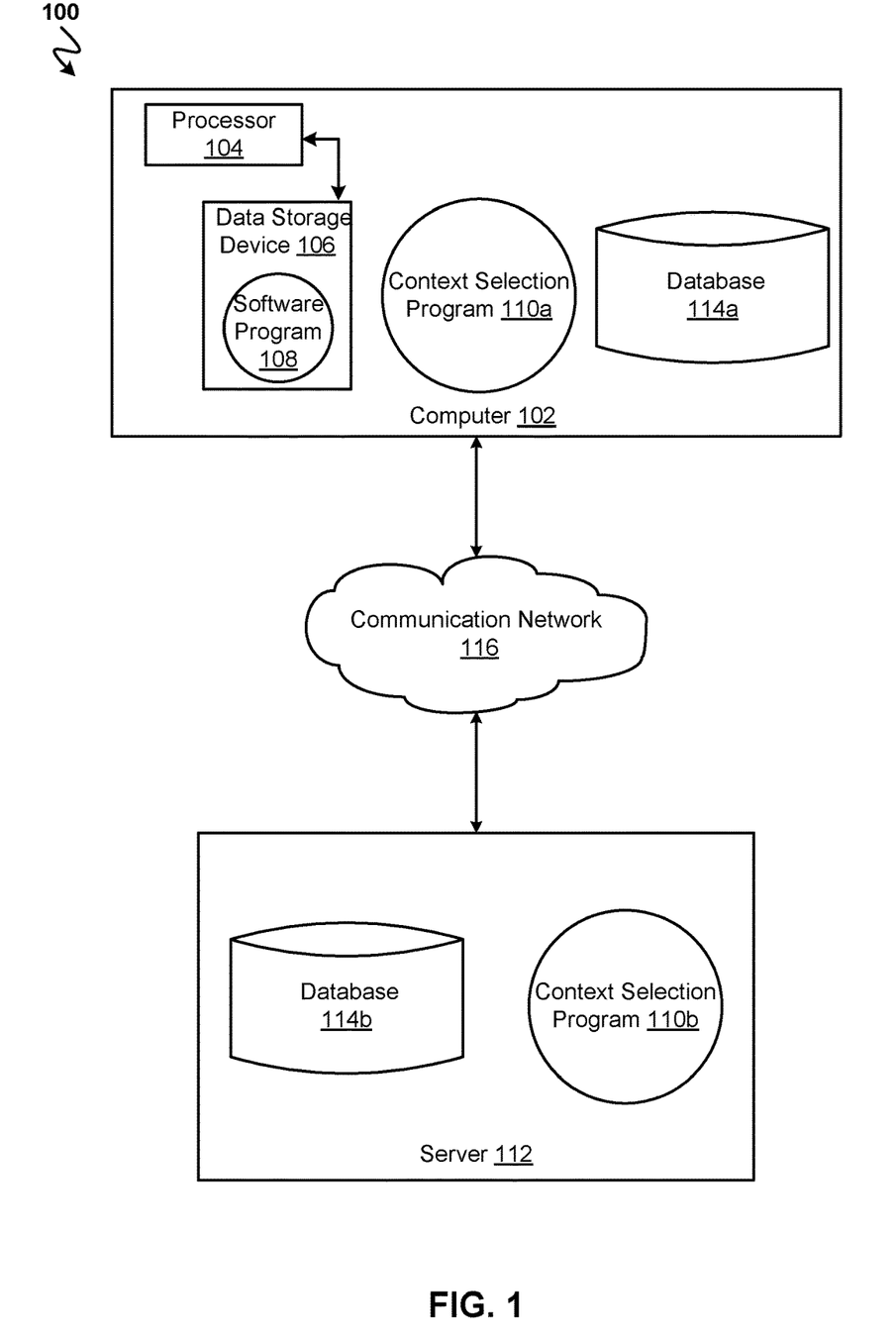
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an instance of the context selection program 110a that may interact with a database 114a. The networked computer environment 100 may also include a server 112 that is enabled to run another instance of the context selection program 110b that may interact with a database 114b and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a local database 114a or a remote database 114b. According to various implementations of the present embodiment, the context selection program 110a, 110b may interact with a database 114a and 114b that may be embedded in various storage devices, such as, but not limited to a computer/mobile device 102, a networked server 112, or a cloud storage service.

According to the present embodiment, a user using a client computer 102 or a server computer 112 may use the context selection program 110a, 110b (respectively) to determine content of interest to a user based on the user's gaze, retrieve enhanced content based on the content of interest, and then display the enhanced content on a mobile device screen. The context selection method is explained in more detail below with respect to FIGS. 2 and 3.

Figure 2:
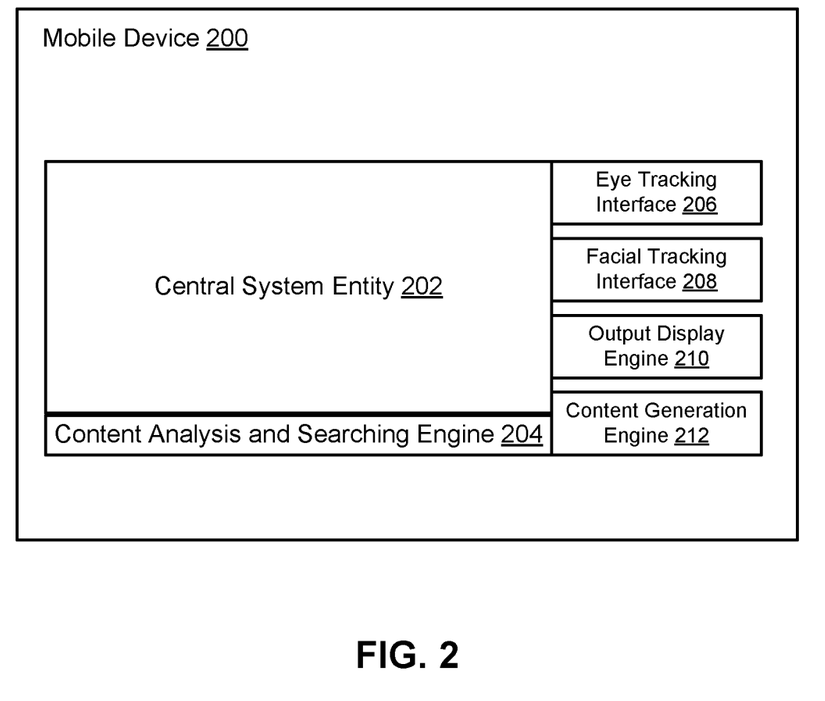
FIG. 2 is a system block diagram of a mobile device according to at least one embodiment.

Referring now to FIG. 2, a system block diagram of a mobile device 200 according to at least one embodiment is depicted. The mobile device 200 may be a client computer 102 running a central system entity 202 such as the context selection program 110a and 110b. The central system entity 202 may interface with a content analysis and searching engine 204, an eye tracking interface 206, a facial tracking interface 208, an output display engine 210, and a content generation engine 212.

The central system entity 202 may use the eye tracking interface 206 and the facial tracking interface 208 to determine where a user is looking on the mobile device 200 screen and the user's reaction to what is displayed on the mobile device 200 screen. Eye tracking and facial tracking may be implemented using known methods and accessed by the central system entity 202 on the mobile device 200 via the eye tracking interface 206 and the facial tracking interface 208.

The content analysis and searching engine 204 may be used by the central system entity 202 to analyze content within a particular region displayed within the mobile device 200 screen and search for more content, for example using the communication network 116 to search internet sources, based on the analyzed content. As described previously, the central system entity 202 may determine tags or other cues relating to the content a user is focusing on using the content analysis and searching engine 204. Furthermore, the content analysis and searching engine 204 may search based on the analyzed tags and cues to find additional content, such as by searching through a website's domain or using existing URLs. The content generation engine may be used by the central system entity 202 to generate a new content rich page based on the analyzed and searched content found by the content analysis and searching engine 204. The central system entity 202 may then use the output display engine 210 to display additional content generated by the content generation engine 212.

Figure 3:
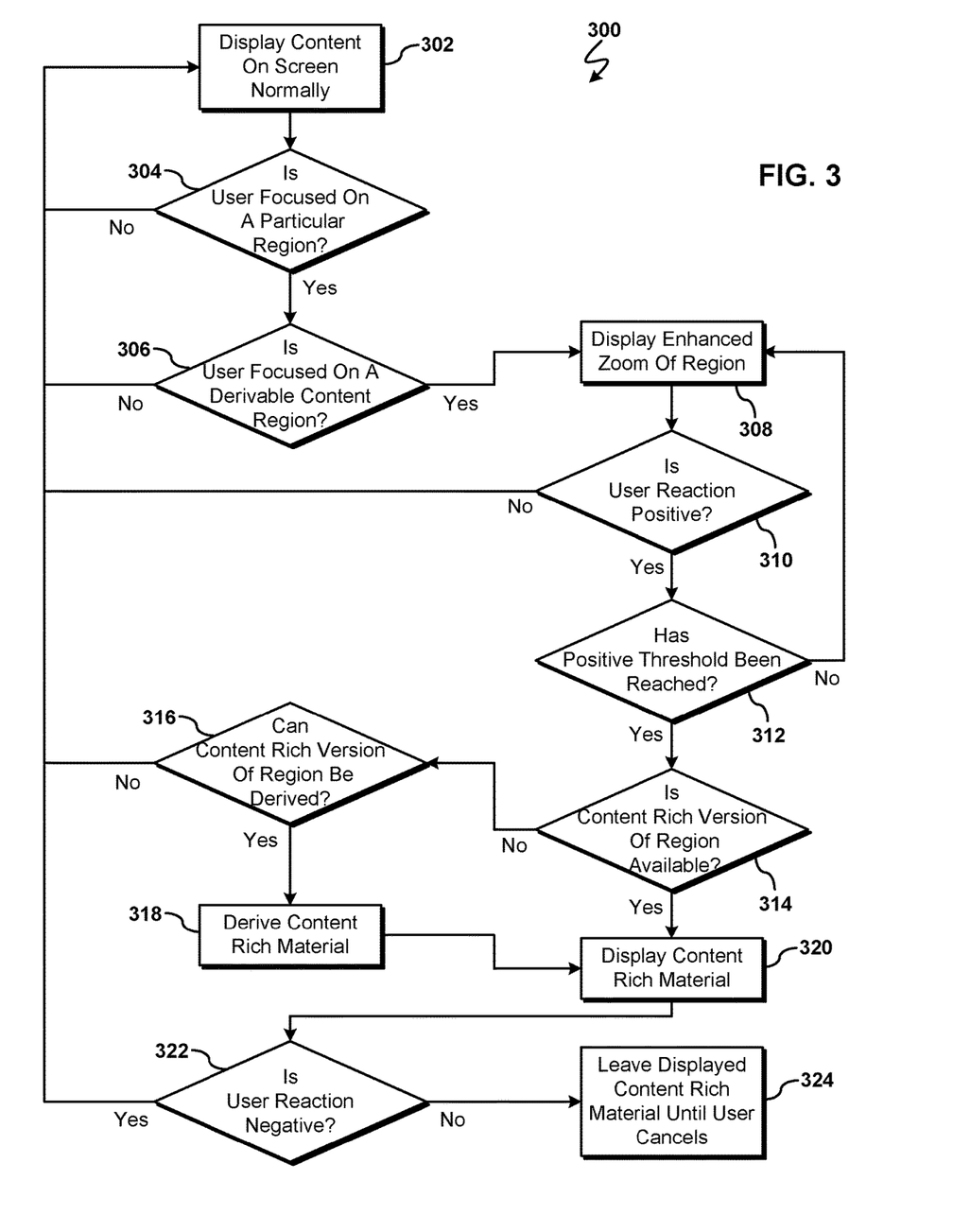
FIG. 3 is an operational flowchart illustrating a process for focus-based context selection according to at least one embodiment.

Referring now to FIG. 3, an operational flowchart illustrating the exemplary focus-based context selection process 300 used by the context selection program 110a and 110b according to at least one embodiment is depicted.

At 302, the mobile device 200 displays content on screen normally. The screen of the mobile device 200 may display a webpage, a mobile application, or other content as the content normally would appear onscreen. For example, if a user is viewing a website on their smartwatch, the website may detect that the user is viewing the website from a mobile device 200 and transmit a simplified version of the website made for a smaller mobile device 200 screen.

Next, at 304, the context selection program 110a and 110b determines if the user is focused on a particular screen region. Using known methods for tracking user focus, the mobile device 200 may determine if the user is focusing on a screen region. According to at least one implementation, known eye tracking methods may be used in conjunction with a front-facing camera to determine where a user is looking relative to the mobile device 200 screen. Based on the known user focus tracking method used, a specific screen region that the user is focusing on may be identified. Using the eye tracking interface 206 and the facial tracking interface 208, the context selection program 110a and 110b may determine if the user is consistently looking at, or focused on, a specific screen region. The context selection program 110a and 110b may, for example, determine if the user is consistently looking at a specific screen region if the user is looking at the screen uninterrupted for a predefined amount of time, or if within a predetermined time window, the user exceeds a threshold amount of time looking at the specific screen region. For example, a user looking at a smartwatch screen will be detected by a front-facing camera within the smartwatch and the user's eyes will be tracked. The context selection program 110a and 110b will then determine that the user is looking at the screen and additionally determine that the user is looking at the top right region of the screen using the eye tracking interface 206. If the context selection program 110a and 110b determined that the user is not focused on a particular screen region, then the context selection program 110a and 110b returns to 302 and continues to display content normally.

However, if the context selection program 110a and 110b determined that the user is focused on a particular screen region at 304, then the context selection program 110a and 110b determines if the user is focused on a derivable content region at 306. Using known methods for parsing content, the content displayed in the screen region that the user is looking at may be parsed to determine if the user is looking at derivable content by searching for tags and other content cues. The context selection program 110a and 110b may parse the content and identify tags and other content cues that may be stored in a data repository, such as a database 114a and 114b. Derivable content may include displayed content that has additional content available. For example, derivable content may include sports scores or news headlines, whereas non-derivable content may include blank space, a clock, or numbers on a calendar. If the context selection program 110a and 110b determined that the that the user is not focused on a derivable content region at 306, then the context selection program 110a and 110b returns to 302 and continues to display content normally.

If the context selection program 110a and 110b determined that the user is focused on a derivable content region at 306, then an enhanced zoom of the region the user is focused on is displayed at 308. The context selection program 110a and 110b (i.e., central system entity 202) may use the output display engine 210 to generate a zoomed view of the content within the region the user is focused on. Different zoom factors may be used based on implementation or user preferences. Additionally, the content cues stored previously at 306, may be filtered or refined to match the current zoomed display region, thus removing content cues that may not be related to the current zoomed display region. For example, if the user is focused on the top right screen region, the screen will be redrawn to display the top right screen region larger and centered while other content, such as content located at the bottom left of the original screen displayed to the user, will be removed.

Then, at 310, the context selection program 110a and 110b determines if the user reacted positively to the enhanced zoom displayed at 308. User reaction may be determined by tracking the eyes of the user, the facial expression of the user, or by other known methods. Using the eye tracking interface 206 and the facial tracking interface 208, the context selection program 110a and 110b may determine if the user looks away from the screen, thereby indicating a negative reaction, or if the user continues to focus on the screen, thereby indicating a positive reaction. If the context selection program 110a and 110b determined that the user did not react positively to the enhanced zoom display, then the context selection program 110a and 110b returns to 302 to display content normally (i.e., before the zoomed version of the content was displayed).

However, if the context selection program 110a and 110b determined that the user did react positively to the enhanced zoom display at 310, then the context selection program 110a and 110b determines if a positive reaction threshold has been reached at 312. The positive reaction threshold may indicate how many times the display has progressively zoomed with a positive reaction from the user. The positive reaction threshold may be a predetermined value, such as an integer, or the specific content being displayed may have a limit regarding how much zooming may occur before further zooming may no longer be beneficial. For example, a page of baseball box scores may zoom until only one box score remains visible, at which point further zooming may not be useful, thus the positive reaction threshold will have been reached. According to another example, if the positive reaction threshold is five, and the display has progressively zoomed in on a screen region three times, the positive reaction threshold has not been reached. If the context selection program 110a and 110b determined that the positive reaction threshold has not been reached, then the display will be progressively zoomed in further at the region the user is focused on by returning to 308.

If the context selection program 110a and 110b determined that the positive reaction threshold has been reached at 312, then the context selection program 110a and 110b will determine if a content rich version of the displayed screen region is available at 314. The context selection program 110a and 110b may use the content analysis and searching engine 204 to determine if a content rich version of the displayed screen region exists by using the stored content cues that were filtered previously as the screen was zoomed and by scanning the currently displayed content. If the content analysis and searching engine 204 can locate a URL that contains more in-depth information related to the content the user is focused on, then that URL may be saved (e.g., in a database 114a) for later use. For example, if the zoomed region of the screen contains a baseball game box score, the content analysis and searching engine 204 may scan the box score region of the website that the user is looking at and determine that there is a URL link to a website with more detailed real-time statistics of the baseball game within the stored content cues. Thereafter, the context selection program 110a and 110b may save the URL address to the website with detailed baseball game information contained in the link.

If the context selection program 110a and 110b determined that a content rich version of the displayed screen region is not available at 314, then the context selection program 110a and 110b will determine if a content rich version of the screen region can be derived at 316. Based on the tags and cues identified previously at 306, the context selection program 110a and 110b may determine if a content rich version of the displayed content may be derived. The context selection program 110a and 110b may use the content analysis and searching engine 204 to handle analyzing the displayed content region and search for richer content. The website domain for the displayed website may be searched for a webpage of related content. If no suitable webpage is found within the website domain, websites outside the website domain may be searched. For example, if the user is currently gazing at a news website's baseball box scores, the system may search the news website's domain first. If no suitable sites are found, then a website for the appropriate baseball organization may be analyzed. Additionally, if no single webpage has suitable content, multiple sources may be identified that collectively contain sufficient rich content. If the context selection program 110a and 110b determined that a content rich version of the screen region cannot be derived, then the context selection program 110a and 110b returns to 302 to display content normally (i.e., before the zoomed version of the content was displayed).

However, if the context selection program 110a and 110b determined that a content rich version of the screen region can be derived at 316, then the content rich material is derived at 318. As described previously at 316, rich content may be derived from a single website or multiple websites. For a single content website, the website URL address may be used to derive or generate the content. In situations when multiple content websites are used collectively to provide sufficient content, each website may be analyzed, relevant constituent content may be identified, and the identified constituent content may be combined and used to derive a content rich version of the displayed content. The content generation engine 212 may be used to derive a content rich version of the displayed content from multiple websites. For example, if the displayed content deals with a news story occurring in a foreign country, some content about the foreign country mentioned in the news story may be located on one website. Another website may contain additional content about the parties involved in the news story. The relevant content from both websites may then be combined by the content generation engine 212 to form a content rich version of the displayed content that may be presented similar to a webpage.

If the context selection program 110a and 110b determined that a content rich version of the displayed screen region is available at 314, or content rich material was derived at 318, then the content rich material is displayed at 320. The content rich material may be displayed by using the output display engine 210 to handle a context switch from displaying the zoomed view to displaying the content rich material. For an existing content rich website, the website found at the previously saved URL address may be displayed to the user. For content rich material that was derived from multiple websites, the derived content rich webpage may be displayed to the user. For example, if the zoomed in region displayed a baseball box score, a context switch would occur, replacing the box score with a content rich webpage with more detailed statistics of the baseball game associated with the box score. Additionally, the content rich material may be cached for later retrieval in the event of a false negative reaction due to, for example, the user being interrupted by someone or an event around the user that takes the user's focus away from the screen.

Then, at 322, the context selection program 110a and 110b determines if the user reacts negatively to the displayed content rich material. As described previously at 310, the reaction of the user may be determined using known methods. If the user reacts negatively to the displayed content rich material, then the context selection program 110a and 110b returns to 302 to display content normally (i.e., before the zoomed version of the content was displayed).

However, if the context selection program 110a and 110b determined that the user reacted positively to the displayed content rich material at 322, then the content rich material is displayed until the user cancels the view at 324. The rich content displayed at 320 is left on screen if the user reacts positively and may continue to be displayed until the user cancels the view. For example, the user may cancel the view by swiping, looking away for a predetermined amount of time, or tapping a button.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements. For example, the content rich material displayed at 320 may be cached for quick retrieval later. Then, if a false negative reaction is determined at 322, the context selection program 110a and 110b may search for cached content rich material at 308 that corresponds to the region that the user is focusing on and then return to 320 to display the cached content rich material again, foregoing the intervening steps.

Figure 4:
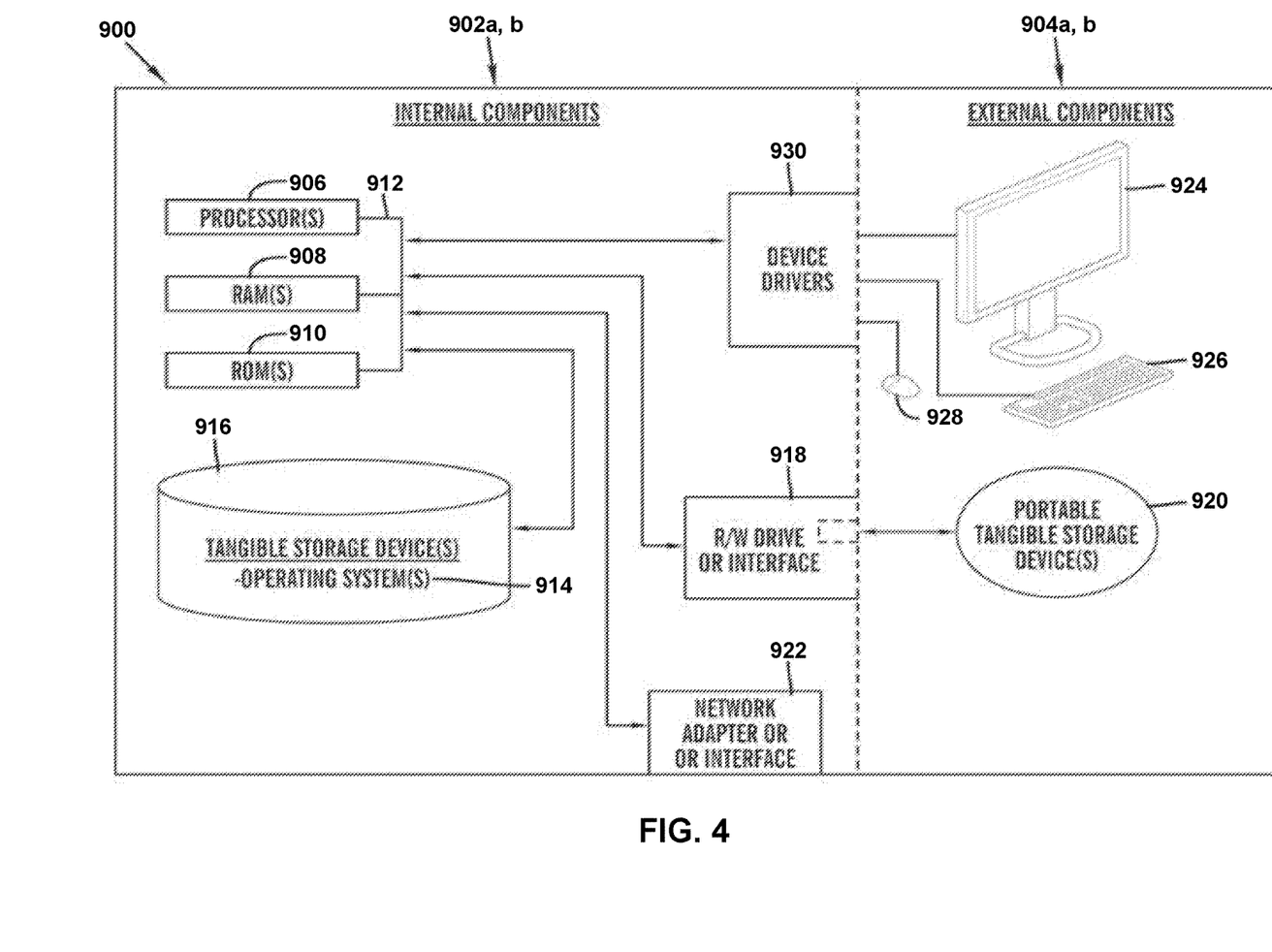
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108, and the context selection program 110a in client computer 102, and the context selection program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the context selection program 110a and 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards, or other wired or wireless communication links. The software program 108 and the context selection program 110a in client computer 102 and the context selection program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the context selection program 110a in client computer 102 and the context selection program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
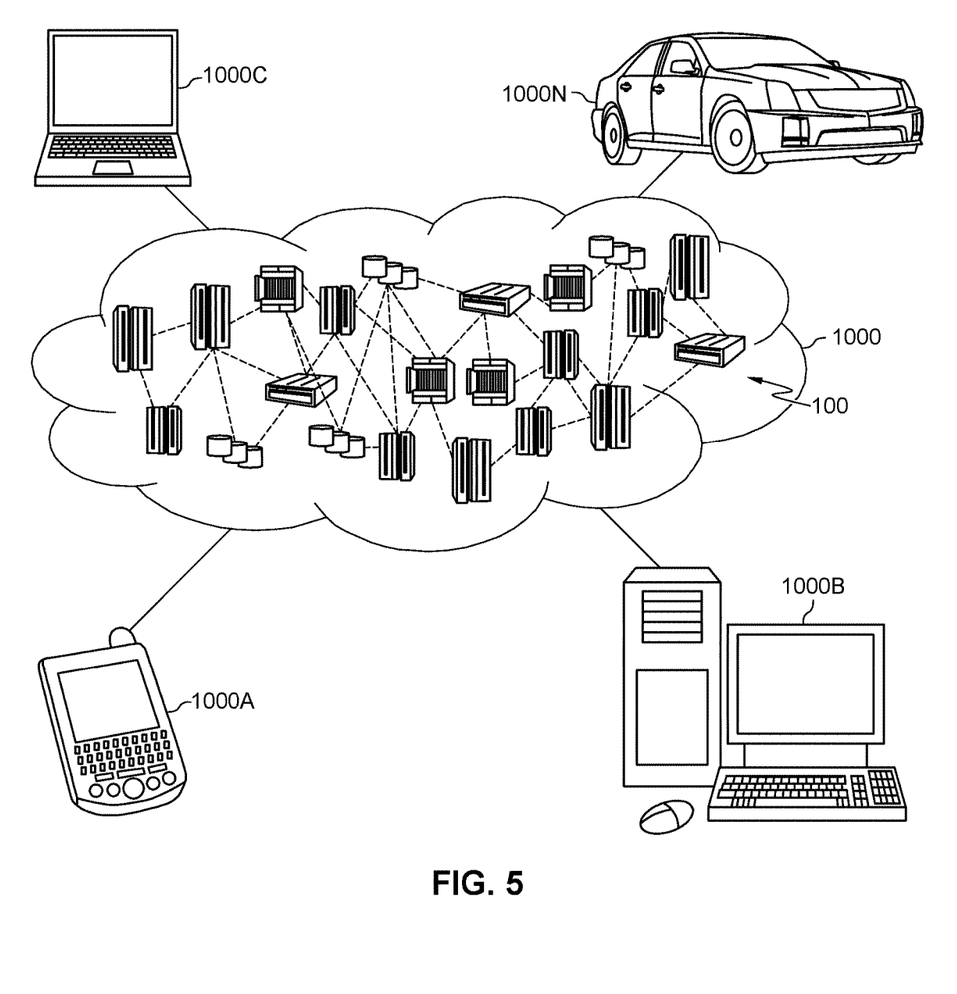
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
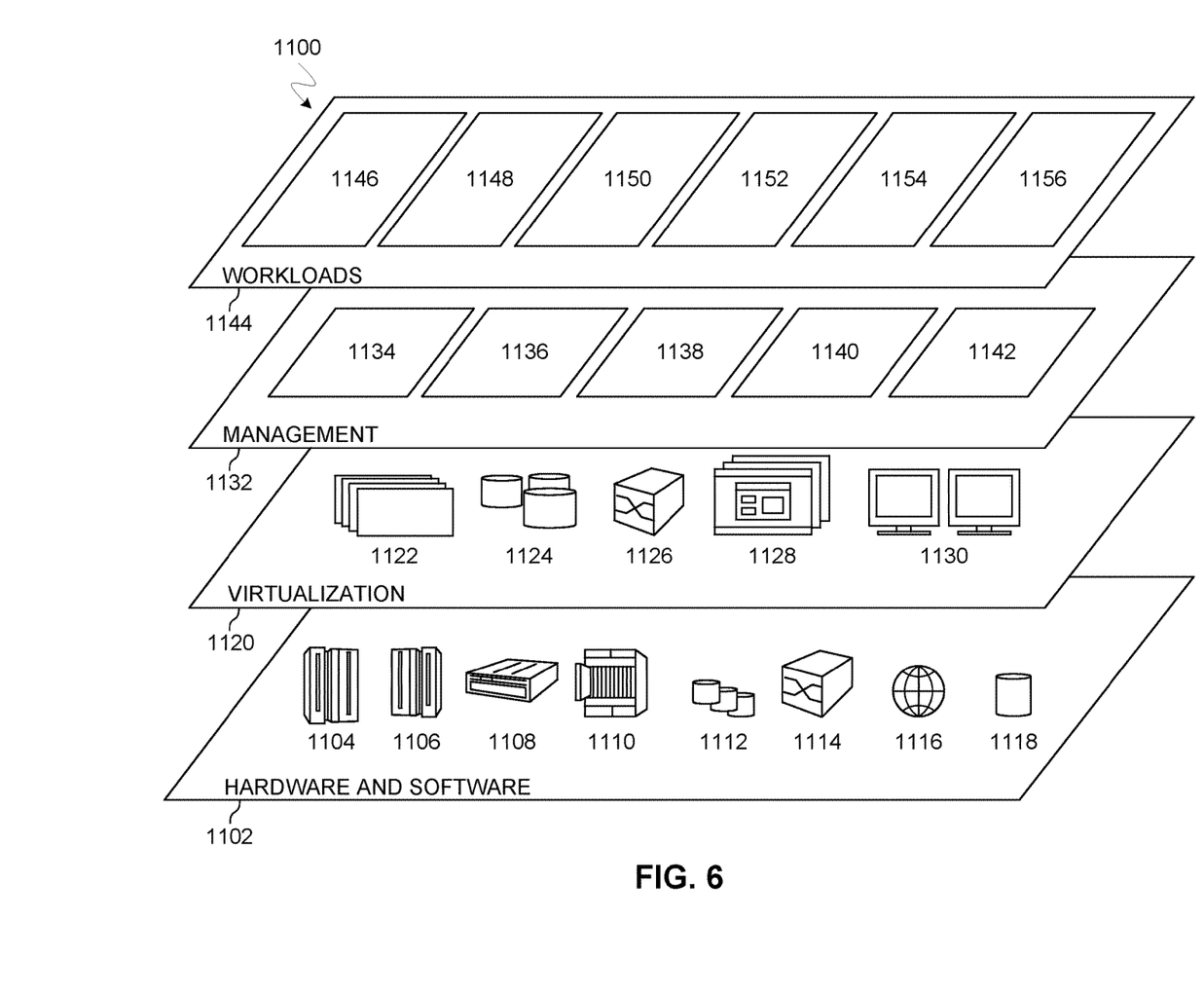
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and focus-based context selection 1156. A context selection program 110a, 110b provides a way to determine content of interest to a user based on the user's gaze, retrieve enhanced content based on the content of interest, and then display the enhanced content on a mobile device screen.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically presenting enhanced content on a mobile device based on user focus, the method comprising:

presenting content on a screen in an initial view;

determining that a user is focused on a specific screen region of the presented content;

generating a zoomed view of the presented content based on the specific screen region the user is focused on;

presenting the zoomed view on the screen;

determining a user reaction in response to the presented zoomed view, wherein the determined user reaction is either a positive reaction or a negative reaction, and wherein the negative reaction is determined based on tracking a facial expression of the user;

in response to determining that the user reaction is the negative reaction, presenting the initial view on the screen;

in response to determining that the user reaction is the positive reaction, determining the enhanced content based on zoomed content displayed in the zoomed view; and presenting the enhanced content on the screen, based on the determining the enhanced content.

2. The method of claim 1, further comprising:

in response to determining that the user reacted positively to the zoomed view, generating a second zoomed view;

presenting the second zoomed view on the screen;

determining that the user reacted positively to the second zoomed view; and determining that a positive reaction threshold is met.

3. The method of claim 1, wherein determining the enhanced content based on the zoomed content displayed in the zoomed view comprises searching for at least one website having additional relevant content associated with the zoomed content.

4. The method of claim 1, wherein determining the enhanced content based on the zoomed content displayed in the zoomed view further comprises determining that the enhanced content is derivable, and wherein the enhanced content is derived by combining constituent content from a plurality of content websites.

5. The method of claim 1, wherein determining that the user reaction is the positive reaction comprises tracking an eye of the user and determining that the tracked eye of the user is focused on the screen.

6. The method of claim 1, wherein determining that the user is focused on the specific screen region of the presented content comprises tracking an eye of the user and determining that the tracked eye of the user is focused on a screen region within a plurality of screen regions associated with the screen.

7. The method of claim 1, wherein determining the enhanced content based on the zoomed content displayed in the zoomed view comprises scanning the zoomed content for content cues.

8. A computer system for automatically presenting enhanced content on a mobile device based on user focus, comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
presenting content on a screen in an initial view;
determining that a user is focused on a specific screen region of the presented content;
generating a zoomed view of the presented content based on the specific screen region the user is focused on;
presenting the zoomed view on the screen;
determining a user reaction in response to the presented zoomed view, wherein the determined user reaction is either a positive reaction or a negative reaction, and wherein the negative reaction is determined based on tracking a facial expression of the user;
in response to determining that the user reaction is the negative reaction, presenting the initial view on the screen;
in response to determining that the user reaction is the positive reaction, determining the enhanced content based on zoomed content displayed in the zoomed view; and
presenting the enhanced content on the screen, based on the determining the enhanced content.

9. The computer system of claim 8, further comprising:
in response to determining that the user reacted positively to the zoomed view, generating a second zoomed view;
presenting the second zoomed view on the screen;
determining that the user reacted positively to the second zoomed view; and
determining that a positive reaction threshold is met.

10. The computer system of claim 8, wherein determining the enhanced content based on the zoomed content displayed in the zoomed view comprises searching for at least one website having additional relevant content associated with the zoomed content.

11. The computer system of claim 8, wherein determining the enhanced content based on the zoomed content displayed in the zoomed view further comprises determining that the enhanced content is derivable, and wherein the enhanced content is derived by combining constituent content from a plurality of content websites.

12. The computer system of claim 8, wherein determining that the user reaction is the positive reaction comprises tracking an eye of the user and determining that the tracked eye of the user is focused on the screen.

13. The computer system of claim 8, wherein determining that the user is focused on the specific screen region of the presented content comprises tracking an eye of the user and determining that the tracked eye of the user is focused on a screen region within a plurality of screen regions associated with the screen.

14. The computer system of claim 8, wherein determining the enhanced content based on the zoomed content displayed in the zoomed view comprises scanning the zoomed content for content cues.

15. A computer program product for automatically presenting enhanced content on a mobile device based on user focus, comprising:
one or more computer-readable storage medium and program instructions stored on at least one of the one or more computer-readable storage medium, the program instructions executable by a processor, the program instructions comprising:
program instructions to present content on a screen in an initial view;
program instructions to determine that a user is focused on a specific screen region of the presented content;
program instructions to generate a zoomed view of the presented content based on the specific screen region the user is focused on;
program instructions to present the zoomed view on the screen;
program instructions to determine a user reaction in response to the presented zoomed view, wherein the determined user reaction is either a positive reaction or a negative reaction, and wherein the negative reaction is determined based on tracking a facial expression of the user;
in response to determining that the user reaction is the negative reaction, program instructions to present the initial view on the screen;
in response to determining that the user reaction is the positive reaction, program instructions to determine the enhanced content based on zoomed content displayed in the zoomed view; and
program instructions to present the enhanced content on the screen, based on the determining the enhanced content.

16. The computer program product of claim 15, further comprising:
in response to determining that the user reacted positively to the zoomed view, program instructions to generate a second zoomed view;
program instructions to present the second zoomed view on the screen;
program instructions to determine that the user reacted positively to the second zoomed view; and
program instructions to determine that a positive reaction threshold is met.

17. The computer program product of claim 15, wherein determining the enhanced content based on the zoomed content displayed in the zoomed view comprises searching for at least one website having additional relevant content associated with the zoomed content.

18. The computer program product of claim 15, wherein determining the enhanced content based on the zoomed content displayed in the zoomed view further comprises determining that the enhanced content is derivable, and wherein the enhanced content is derived by combining constituent content from a plurality of content websites.

19. The computer program product of claim 15, wherein determining that the user reaction is the positive reaction comprises tracking an eye of the user and determining that the tracked eye of the user is focused on the screen.

20. The computer program product of claim 15, wherein determining that the user is focused on the specific screen region of the presented content comprises tracking an eye of the user and determining that the tracked eye of the user is focused on a screen region within a plurality of screen regions associated with the screen.

\* \* \* \* \*